UNITED STATES PATENT OFFICE 3,751,444
Patented Aug. 7, 1973

3,751,444
PROCESS FOR THE PREPARATION OF 2,2-DIBROMO-2-CYANOACETAMIDE
Richard H. Solem and Lawrence D. Berg, Midland, Mich., assignors to The Dow Chemical Company, Midland, Mich.
No Drawing. Filed July 26, 1971, Ser. No. 164,884
Int. Cl. C07c *121/02, 121/16*
U.S. Cl. 260—465.4    7 Claims

ABSTRACT OF THE DISCLOSURE

Disclosed is an improvement to the process of preparing 2,2-dibromo-2-cyanoacetamide by the acid catalyzed reaction of cyanoacetamide and bromine at a temperature no greater than 40° C. and HBr concentration no greater than 20%. The improvement involves oxidizing the by-product HBr in solution to bromine with a soluble bromate. The oxidation permits the reaction solution to be recycled thereby avoiding a waste disposal problem and increasing the yield of the desired product.

BACKGROUND OF THE INVENTION 2,2-dibromo-2-cyanoactamide (DBCA) is of commercial interest due to its biocidal activity in aqueous systems. This compound is useful in controlling the fouling of cooling towers due to slime accumulation and the pretreatment (slime-removal) of logs prior to pulping operations in the paper industry.

The preparation of DBCA involves the acid catalyzed reaction of cyanoacetamide with bromine in aqueous solution. At strong acid concentrations the reaction product is degraded by hydrolysis. Accordingly, HBr which is co-produced with DBCA should not be allowed to accumulate to a concentration of greater than 20% on a salt free basis. Hydrolysis also becomes a serious problem at temperatures greater than 40° C. making this the maximum operating temperature for economical production. The minimum temperature is determined by the freezing point of the system. The above-described process is nearly quantitative with most of the DBCA precipitating out of solution. Recovery of the precipitate leaves an aqueous HBr mother liquor containing about 0.67 gm. of HBr per gram DBCA precipitated. The liquor also contains about 1½% dissolved DBCA in solution as well as some organic degradation products resulting from hydrolysis during the reaction. Disposal of the waste liquor is problematical. Sending it to a waste treatment plant is not satisfactory because the dissolved DBCA is an active biocide and could destroy bacteria in the treatment plant. Transferring the liquor to a bromine recovery plant is not appealing due to its high organic content. Sending the liquor to a waste burner is also objectionable since incineration would result in an HBr fume released into the atmosphere.

From the above discussion it is apparent that a novel approach would be desirable in treating waste liquor produced in the DBCA process. Accordingly, it is an object of the present invention to provide a method for substantially reducing the waste disposal problems existing in the preparation of DBCA.

An additional object is to provide such a method which increases the yield of DBCA.

A further object is to provide such a method which proceeds rapidly enough to be considered commercially feasible.

SUMMARY OF THE INVENTION

The present invention is an improvement in the process for preparing 2,2-dibromo-2-cyanoacetamide and HBr by the reaction of cyanoacetamide and bromine. The improvement comprises introducing a soluble bromate into the reaction mass. It has been found that under the reaction conditions necessary for efficient production, i.e. temperature no greater than 40° C. and HBr concentration no greater than 20%, bromate will oxidize bromide to bromine in substantially less time than other oxidizers without forming undesirable side products.

DETAILED DESCRIPTION

The primary reaction for the preparation of DBCA is represented by the equation:

$$(1) \quad N\equiv C-CH_2-\overset{O}{\overset{\|}{C}}-NH_2 + 2Br_2 \xrightarrow{[H^+]} N\equiv C-CBr_2-\overset{O}{\overset{\|}{C}}-NH_2 + 2HBr$$

The equation representing the oxidation of bromide to bromine by a soluble bromate is:

$$(2) \quad MBrO_3 + 6HBr \longrightarrow 3Br_2 + MBr + 3H_2O$$

The net reaction is:

$$(3) \quad N\equiv C-CH_2-\overset{O}{\overset{\|}{C}}-NH_2 + 3Br_2 + MBrO_3 \longrightarrow$$
$$3N\equiv C-CBr_2-\overset{O}{\overset{\|}{C}}-NH_2 + MBr + 3H_2O$$

By this mechanism, by-product HBr is consumed and elemental bromine regenerated which in turn can be reacted with additional cyanoacetamide to form the desired product (DBCA). Comparison of Equations 1 and 3 illustrates that only half as much bromine is required to produce DBCA when bromate is introduced. Recycling the reaction media accomplishes recovery of the 1½% dissolved DBCA which would otherwise be discarded.

It should be noted that in order to maintain a continuous reaction the amount of $BrO_3^-$ added should be less than stoichiometric with the $Br^-$. This precaution is necessitated by the fact that the primary reaction is acid catalyzed. Preferably, the amount of $BrO_3^-$ added is no more than ⅙ of stoichiometric with the $Br^-$ at any given time.

In the above manner, a troublesome waste stream is eliminated. Additionally, yields are increased since unprecipitated DBCA is recovered. Another advantage is the more complete use of bromine. The bromate ion has been selected for use in the instant process because it will convert bromide to bromine at a commercially feasible rate under the conditions found in the DBCA system. The requirement that the temperature not exceed 40° C. and that the HBr concentration not exceed 20% eliminates many oxidizing agents from consideration. Those that do work under such conditions, with the exception of bromate, do not convert bromide to bromine with sufficient speed to be useful in a commercial operation or for by-products which are incompatible with the DBCA system.

The general procedure for preparing DBCA by the present recycle process is as follows:

(a) The mother liquor from a previous run is fed into the reactor. The bromide for the first run is provided by an aqueous solution of 36% NaBr and 2% HBr.

(b) One mole of cyanoacetamide (84 gm.) is added per 1000 gm. of water in the recycle liquor with the reaction mass being stirred and the temperature adjusted to 15° C.

(c) Bromine is fed to the reactor while the temperature is maintained below 40° C. and preferably at from 15 to 20° C. One mole of bromine (160 gm.) is added per mole of cyanoacetamide. After addition of bromine, the reaction is allowed to continue until the red bromine color is no longer visible.

(d) Solid sodium bromate is added to the reaction mass at a temperature below 40° C. The sodium bromate is normally added incrementally, the amount of each increment being sufficiently small so that there are at least 6 moles of HBr in solution per mole of sodium bromate before additional sodium bromate is added. Sodium and potassium bromate are the preferred forms of bromate for use in the disclosed process. However, the cation does not enter into the reaction and any soluble bromate may be used as the $BrO_3^-$ source. The alkali or alkaline earth metal bromates are preferred.

(e) After all of the sodium bromate is added, and the reaction allowed to proceed to the desired state of completion the reactor contents are filtered to recover DBCA.

The oxidation reaction can be carried out under the conditions of temperature and acid concentration at which the bromination runs well, i.e. a temperature of from the freezing point of the system to 40° C. and acid concentration no greater than 20%. The preferred temperature range is from 15° to 20° C. and preferred acid concentration is initially from 1 to 2% HBr. As the reaction progresses, the acid concentration will increase until $NaBrO_3$ is added to bring the acid concentration down to the initial level.

EXAMPLE I

Cyanoacetamide (84.2 gm.) was dissolved in 1486 ml. of recycle liquor from a previous run. This liquor contained about 1250 gm. $H_2O$, 750 gm. NaBr, 40 gm. HBr and 20 gm. DBCA. Bromine (160 gm.) was added over a period of 35 minutes and allowed to react until the red color was no longer visible. Sodium bromate (29.3 gm.), was added and the bromine formed by oxidation of HBr was allowed to react with cyanoacetamide still in solution. Additional sodium bromate (11.7 gm.) was added and the reaction allowed to go to near completion. Finally, 9.3 gm. of $NaBrO_3$ was added and the reaction allowed to finish. The reaction was carried out in an agitated, all glass system with a temperature range of from 13 to 21° C. The peak acid concentration was 7.2% over the three hour reaction period.

The DBCA solids were filtered, yielding 281 gm. of wet solids. Active bromine titration showed the product to be 85% DBCA, which represents a 98.5% yield based upon cyanoacetamide. About 60 gm. of the mother liquor was removed from the system to control the build up of by-product NaBr and $H_2O$. The remainder was recycled to the next run.

EXAMPLE II

Fifteen laboratory scale runs were made in which DBCA was prepared by reacting cyanoacetamide with $Br_2$. The reaction was carried out within a temperature range of from 10 to 25° C. and peak acid concentration of 7.2%. In each run the mother liquor was recycled by the addition of $NaBrO_3$. Table I sets out the actual yield from each batch as well as the percent yield of DBCA based on cyanoacetamide as limiting substance. The first batch showed a yield of only 76.6% because some DBCA stayed in solution and a 5% excess of cyanoacetamide was used. The remaining fourteen runs provided yields allowing for experimental error ranging from 92.0% to 100.5%, with an average of 97.7%. Yields of less than 100% were attributed to side reactions, product degradation and incomplete product recovery. The amounts of reactants and products obtained in each run are set out in Table I.

TABLE I

| Run No. | Reactant Cyanoacetamide (gm.) | Reactant $BR_2$ (gm.) | Reactant $NaBrO_3$ | Product DBCA (gm.) | Product Percent yield |
|---|---|---|---|---|---|
| 1 | 88.0 | 150 | 53.4 | 194.1 | 76.6 |
| 2 | 84.2 | 150 | 53.4 | 241.3 | 99.5 |
| 3 | 84.2 | 160 | 50.3 | 242.8 | 100.1 |
| 4 | 84.2 | 150 | 50.3 | 233.4 | 96.3 |
| 5 | 84.2 | 160 | 50.3 | 234.4 | 96.7 |
| 6 | 84.2 | 160 | 50.3 | 239.7 | 98.9 |
| 7 | 84.2 | 160 | 50.3 | 243.9 | 100.5 |
| 8 | 84.2 | 160 | 50.3 | 232.9 | 96.0 |
| 9 | 84.2 | 160 | 50.3 | 223.1 | 92.0 |
| 10 | 84.2 | 160 | 50.3 | 235.0 | 96.9 |
| 11 | 84.2 | 160 | 50.3 | 234.1 | 96.5 |
| 12 | 84.2 | 160 | 50.3 | 239.8 | 98.9 |
| 13 | 84.2 | 160 | 50.3 | 243.4 | 100.4 |
| 14 | 84.2 | 160 | 50.3 | 232.6 | 95.9 |
| 15 | 84.2 | 160 | 48.0 | 239.9 | 98.9 |

EXAMPLE III

In order to determine the relative rates at which various oxidizers would oxidize bromide to bromine in the DBCA system, comparative runs were made in a 10% HBr solution at 23° C. The relative oxidation rates were determined by visual colorimetric means to be as follows:

$$BrO_3^- > H_2O_2 > ClO_3^- > NO_3^- > ClO_4^-$$

The nitrate and perchlorate ions caused no visible reaction in a 30 minute period. Bromate reacted by at least one order of magnitude faster than did $H_2O_2$ or $ClO_3^-$.

The redox stoichiometry and potential for reactions involving the oxidizing agents are ars follows:

| Reaction: | Oxidation potential |
|---|---|
| $NaBrO_3 + 6HBr \rightarrow 3Br_2 + NaBr + 3H_2O$ | 0.404 |
| $H_2O_2 + 2HBr \rightarrow Br_2 + 2H_2O$ | .689 |
| $NaClO_3 + 6HBr \rightarrow 3Br_2 + NaCl + 3H_2O$ | 0.364 |
| $NaClO + 2HBr \rightarrow Br_2 + NaCl + H_2O$ | 0.628 |
| $2NaNO_3 + 12HBr \rightarrow 5Br_2 + N_2 + 2NaBr + 6H_2O$ | 0.159 |
| $NaClO_4 + 6HBr \rightarrow 4Br_2 + NaCl + 4H_2O$ | 0.302 |

The oxidation potentials were calculated from values set out in Pourbaix, Atlas of Electrochemical Equilibria in Aqueous Solution, Pergamon Press, 1966.

From the above table, it can be observed that the relative oxidation rates were not predictable from a comparison of oxidation potentials.

It has been concluded that bromate is the only acceptable oxidizing agent for the system under consideration. Peroxide and chlorate have been found to be good oxidizers at high acid concentration but react at unacceptably slow rates at the low acid concentration necessary for product stability.

EXAMPLE IV

Recycle was attempted using sodium chlorate as the oxidizing agent in a saturated NaCl solution. The HBr concentration ranged from 20% to a peak of 33% calculated on a NaCl free basis. An adequate reaction rate of the $ClO_3^-$ with HBr was observed at the peak 33% level as indicated by an immediate increase in reaction temperature on addition of the first increment of $NaClO_3$. Significantly slower oxidation occurred at the final 20% HBr level. After addition of the last $NaClO_3$ increment the system was vigorously stirred for 45 minutes and filtered. The filtrate was allowed to stand for several hours during which period additional DBCA was observed to precipitate indicating that regeneration of $Br_2$ was continuing. Similar experiments in, which $BrO_3^-$ was employed to oxidize Br− in 5% HBr resulted in an almost instantaneous reaction.

We claim:

1. In combination with the reaction of cyanoacetamide with bromine in aqueous solution to form 2,2-dibromo-2-cyanoacetamide and HBr, said reaction being carried out at a temperature no greater than 40° C. and HBr concentration sufficient to acid catalyze said reaction but no greater than 20%, the improvement which comprises introducing a soluble bromate into the aqueous reaction solution thereby oxidizing the bromide of the HBr to bromine.

2. The process of claim 1 wherein the amount of bromate added is less than stoichiometric with the bromide.

3. The process of claim 1 wherein the amount of bromate added is no more than 1/6 of stoichiometric with the bromide at any given time.

4. The process of claim 1 wherein the temperature is maintained at a temperature within the range of from 15° to 20° C.

5. The process of claim 1 wherein the oxidizing agent is an alkali or alkaline earth bromate.

6. The process of claim 5 wherein the oxidizing agent is sodium or potassium bromate.

7. The process of claim 1 wherein the initial HBr concentration is from 1 to 2 percent.

References Cited
UNITED STATES PATENTS

| | | | |
|---|---|---|---|
| 3,488,734 | 1/1970 | Burk | 260—465.4 |
| 3,403,174 | 9/1968 | Chance et al. | 260—465.4 |
| 3,557,184 | 1/1971 | Toepfl et al. | 260—465.4 |

JOSEPH P. BURST, Primary Examiner

PO-1050  
(5/69)

UNITED STATES PATENT OFFICE
CERTIFICATE OF CORRECTION

Patent No. 3,751,444          Dated  August 7, 1973

Inventor(s)  Richard H. Solem and Lawrence D. Berg

It is certified that error appears in the above-identified patent and that said Letters Patent are hereby corrected as shown below:

Column 4 (Example III), lines 35, 36, 37, 38, 40 and 41, under the column heading Oxidation potential, insert minus signs (-) as follows:

-0.404

- .689

-0.364

-0.628

-0.159

-0.302

Column 6, last line, change "Burst" to --Brust--.

Signed and sealed this 25th day of December 1973.

(SEAL)
Attest:

EDWARD M. FLETCHER, JR.          RENE D. TEGTMEYER
Attesting Officer                Acting Commissioner of Patents